Sept. 27, 1960  H. WARREN  2,954,241
QUICK HITCH DEVICE AND SPREADER LEVELING ARRANGEMENT
Filed Feb. 17, 1958  3 Sheets-Sheet 1
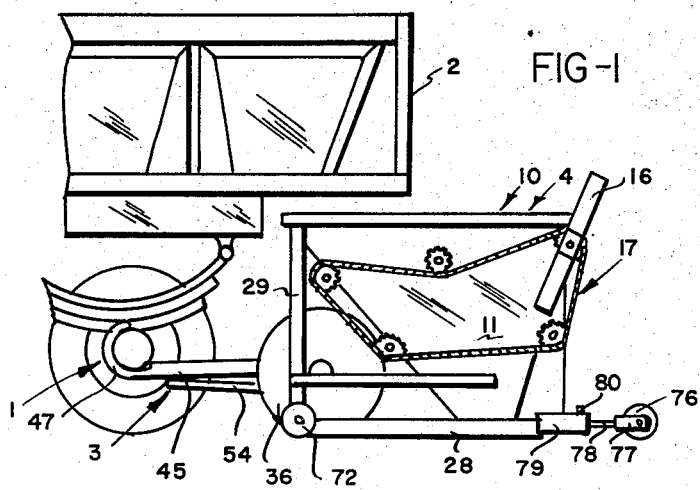
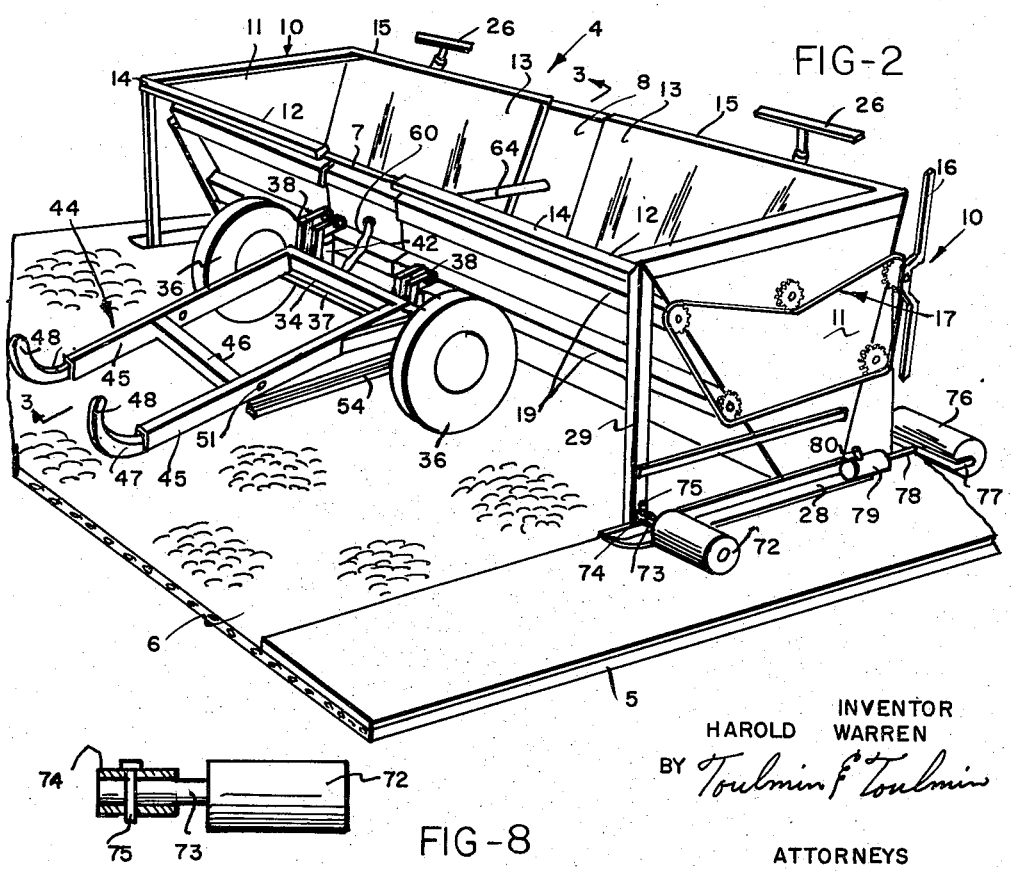
INVENTOR
HAROLD WARREN
BY Toulmin & Toulmin
ATTORNEYS

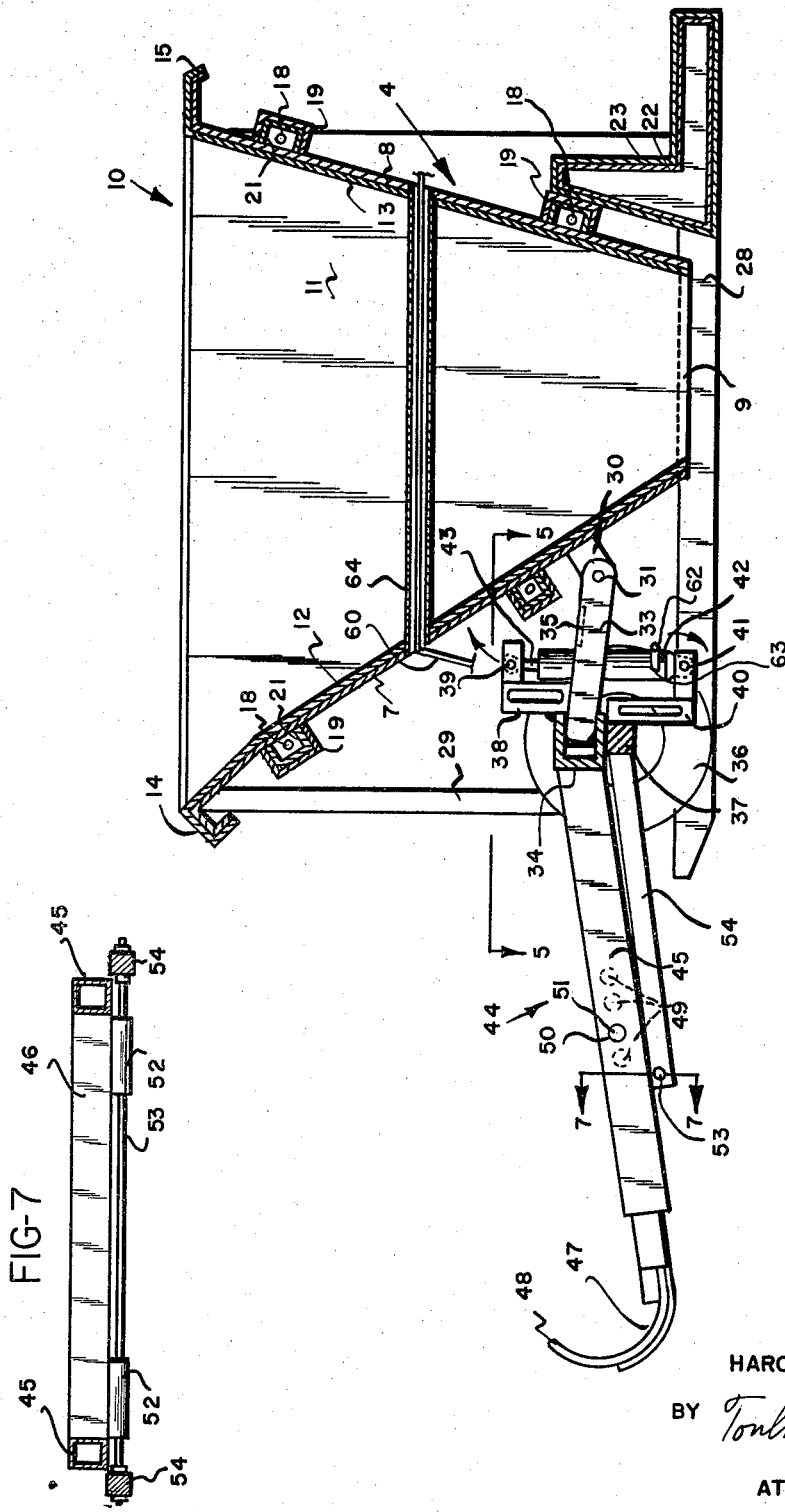

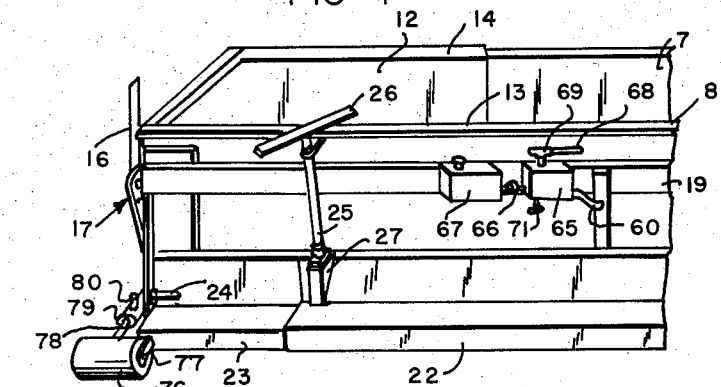
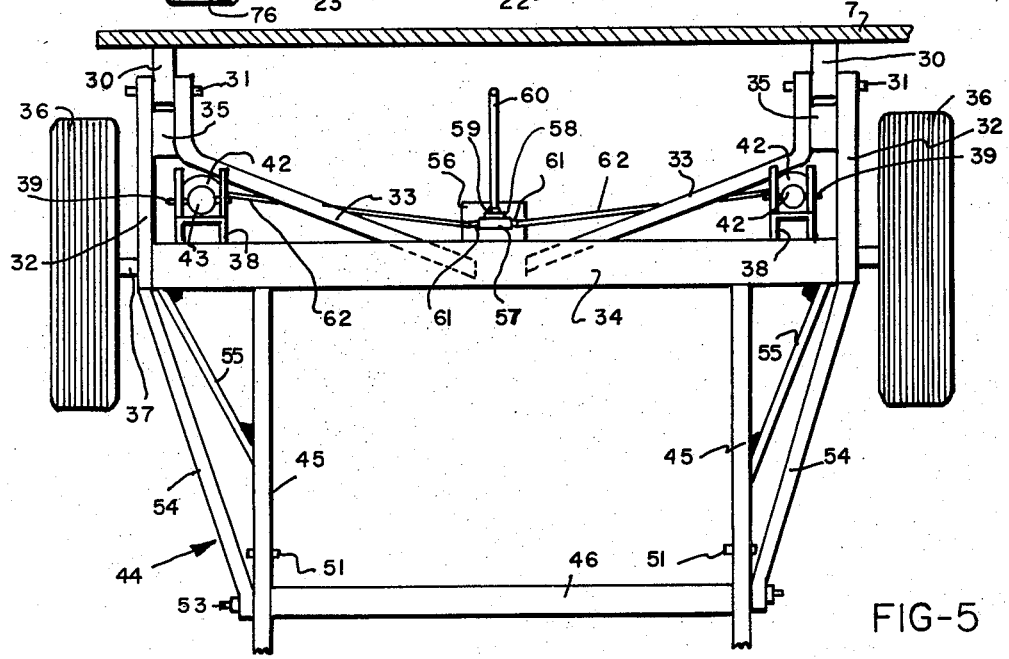
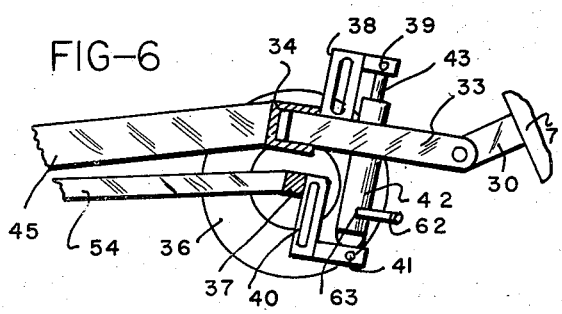

United States Patent Office 2,954,241
Patented Sept. 27, 1960

2,954,241

QUICK HITCH DEVICE AND SPREADER LEVELING ARRANGEMENT

Harold Warren, P.O. Box 413, Springfield, Ohio

Filed Feb. 17, 1958, Ser. No. 715,789

8 Claims. (Cl. 280—476)

This invention relates to a spreader device and is particularly directed to spreader devices for the paving of driveways, roads and the like.

The operation of such spreaders normally involves the application of hot mixes, cold mixes, stone, gravel and similar materials. It is important that the spreader when dispensing these materials be substantially level in order that the completed work will be smooth and uniform throughout.

It is of particular importance that the running seams between adjoining material applications be smooth and substantially unnoticeable. In many instances the attainment of this result is dependent upon subsequent hand smoothing operations, a factor which materially increases the time and expense involved in a given section of work.

This invention contemplates the provision of a novel pivotally mounted spreader hitch which not only tends to maintain the spreader level over its length but which also facilitates attachment of the spreader to trucks, tractors and the like for drawing of the spreader.

A particular feature of the invention is the provision in conjunction with the spreader of supporting rollers which operating in tandem tend both to distribute the weight of the spreader and to smooth the seam or joint between spreader applications; in cooperation with the pivotally mounted hitch, which also aids in support of the spreader, the rollers tend to prevent gouging adjacent a seam by skids or supporting runners of the spreader by maintaining a level relationship of the spreader.

The invention will be more fully understood by reference to the following detailed description and accompanying drawings wherein:

Figure 1 is a diagrammatic and fragmentary side elevational view of the structure of invention secured to a truck for drawing of the spreader;

Figure 2 is a perspective view, enlarged, of the spreader embodying the principles of this invention and illustrating the device applying a hot mix to a bed adjacent a first width of the paving material, as in the paving of a driveway;

Figure 3 is a sectional view of the spreader and hitch taken substantially on line 3—3 of Figure 2;

Figure 4 is a fragmentary view taken from the rear of the spreader device;

Figure 5 is a plan view, partially in section taken substantially on line 5—5 of Figure 2 and with parts broken away illustrating the hitch arrangement;

Figure 6 is a fragmentary and diagrammatic view with parts broken away illustrating the hitch mechanism in a raised position;

Figure 7 is a detail view partially in section of a portion of the hitch; and

Figure 8 is a detail view illustrating the mounting of one of the rollers.

Referring to the drawings the numeral 1 in Figure 1 generally designates the axle housing of a truck 2 with which the hitch generally indicated at 3 is engaged. The hitch 3 is carried by the spreader device 4. It is to be noted that no hitching arrangement is required to be carried on the truck itself for secure engagement with the spreader and for towing of the spreader.

Referring now to Figure 2 the numeral 5 designates a paved portion of a driveway, while the numeral 6 indicates a portion of the driveway being laid to join with the portion 5. Particularly in hot mix applications the paved portion is subject to some gouging and the like as the spreader traverses, and frequently it is necessary to level the seam portion by hand to provide a smooth result.

Reference is first made briefly to the spreader box itself, which box is described and claimed in my copending application, Serial No. 660,827, filed May 22, 1957. It is to be understood, however, that the invention is applicable to other spreader boxes, including those having no adjustability lengthwise. However, the specific box illustrated has proven thoroughly satisfactory in combination with the features of this invention.

The box comprises a forward stationary wall member 7 and a rear stationary wall member 8, which walls extend laterally of the box over a major portion of the box length. These wall members 7 and 8 taper inwardly downwardly and define an open hopper bottom 9 through which paving material, such as the hot mix, is distributable to the driveway.

Wall members 7 and 8 are each flanged outwardly at their upper ends (Figure 3) over the length thereof; an end closure unit 10 comprised of an end panel 11 and side panels 12, 13 is telescoped over one end of the members 7, 8 and connects these members together and with the members forms one end of the spreader box. A second and similar end closure unit at the second end of the device, also designated generally by the numeral 10, completes the spreader box.

The panels 12, 13 of the end closure units lie along the inner side of the stationary walls while flanges 14, 15 of the end closure units engage over the flanged upper ends of the stationary members 7, 8.

The telescoped end closures are slidable on the stationary wall members for adjustment of the length of the box. This adjustment is suitably attained for each end closure by manual rotation of a handle 16 which through the medium of a chain and sprocket drive, generally indicated at 17, actuates a plurality of screw threaded shafts 18 housed in channels 19 carried by the telescoping and closure units.

Screw threaded shafts 18 cooperating with nuts 20 carried on the stationary wall members are provided in channels 21 carried on the stationary wall members; channels 21 suitably telescope with the channels 19 of the end closure units. Thus the cooperating screw and nut combinations provide for easy end closure movement.

Similarly a fixed screed portion 22 is supported by and spaced from the stationary wall 8 and receives in telescoping relation screed portions 23 mounted on the end closure units. The screed portions 22 move laterally of the box with the end closure units. Support of the screed is effected in any suitable manner as through linkage on the end wall designated at 24 in Figure 4; also the screed is vertically adjustable through the medium of a threaded screw rod 25 carrying handle 26 at its upper end and projecting into a fixed nut (not shown) housed with a shell casing 27 on the fixed portion of the screed; each end of the screed and box are similarly provided and accordingly the device is adjustable in the pertinent dimensions.

To complete the general description of the spreader skids 28 or other common spreader support means are secured to standards as at 29 which are themselves supported from the end closure unit and the skid is also suitably welded to the lower portion of the closure unit end wall 11.

In connection with the spreader box described and other boxes of commerce, it is to be noted that when providing a pavement as illustrated in Figure 2, the skid at one longitudinal end of the box will lie on the hot material 5 of the first pass; the other end of the box which is over the bed 6 will be at a slightly lower level, usually about 2 inches below that of the laid mix. Gouging of the laid portion may then occur particularly at the rear of the spreader. The mechanism now to be described aids the leveling of the spreader during the paving operation and also attachment to the truck or other pulling device.

Referring to Figure 3, the forward stationary wall 7 at its lower end is provided with an ear 30 through an aperture of which pivot pin 31 is passed; mounted for pivoting movement on pin 31 are link members 32, 33 (Figure 5) which form draw bar means for the spreader.

Link member 32 passes forwardly upwardly and is welded or otherwise suitably secured to a cross-member in the form of a channel iron 34; the link member is secured adjacent one end of the channel, the channel extending lengthwise of the spreader box and the recess of the channel opens rearwardly.

Link member 33 also extends forwardly but intermediate its length it is curved and passes to the channel 34 into the recess thereof. Member 33 at its forward extremity is welded to the channel iron substantially centrally of the length thereof. Also member 33 and member 32 adjacent the pivot 31 and ear 30 extend forwardly in parallel relation and are secured together by a metal pad 35 welded thereto. The arrangement is similar at each end of the hitch and corresponding numbers have been used to designate corresponding parts. Also since each end is identical only one end is described in detail throughout.

The hitch includes spaced wheels 36 of relatively large diameter which are journalled for free rotation on an axle 37 of square cross-section. These wheels suitably comprise pneumatic tires and they support the spreader centrally and carry a portion of the weight; channel iron 34 in the down position of the hitch rests on the axle 37 (Figure 3).

Supported from and extending rearwardly of and above channel iron 34 is an ear-carrying bracket 38 in the form of a channel; bracket 38 is positioned inwardly of the channel end and is provided with a pivot pin 39 upwardly thereon; a similar bracket 40 depends from the axle 37 below and in line with the bracket 38 and bracket 40 at its lower end is provided with a pivot pin 41.

The numeral 42 designates a hydraulic cylinder through the lower end of which the pin 41 passes; the piston of this cylinder indicated by the numeral 43 forms with the cylinder hydraulic lift means and receives at its upper end the pivot pin 39. Accordingly this hydraulic component is pivotally supported at its lower and upper ends for pivot movement in a plane extending forwardly and rearwardly. A similar arrangement is provided on each side of the hitch.

Thus the axle and channel are pivotally interconnected by the hydraulic lift means and form with the hydraulic lift means a kind of floating mount for the link means.

The channel iron 34 forms a rear support for a tow frame generally indicated at 44 and which includes forwardly extending hollow arms 45 of rectangular cross section, and a transverse arm 46 joins the arms 45. Arms 45 extend beyond the transverse arm in parallel relation and receive therein hook elements 47; the elements 47 carry hooks 48 at the forward end and rearwardly are of rectangular cross section for receipt in the arms 45; elements 47 rearwardly are provided with a series of spaced apertures 49. The hooks 48 are attachment means for securing the hitch to a towing vehicle (Figure 1).

An opening 50 in a hollow arm 45 is arranged to be aligned with an aperture of the hook element and a removable pin 51 is received through a mating opening and aperture to retain the hook element positioned in the arm. The cooperating pin, aperture and opening determine the extension of the hook 48 beyond the end of the arm.

Transverse arm 46 has welded thereto at each end and beneath the arm (Figure 7) a short tubular bearing 52. A long pivot rod 53 projects lengthwise of the arm through the bearings. The pivot rod ends are pivotally connected with braces designated by the numeral 54. Braces 54 extend from the axle 37 in opposed relation as shown and each is secured to the axle as by a weld. Thus the braces pivotally support the tow frame and the braces pivot with turning of the axle.

A pair of frame reinforcements 55 extend from the channel iron 34 and are welded to arms 45 also as shown in the drawings.

Axle 37 intermediate the length thereof has welded thereto a short rearwardly projecting plate 56 (Figure 5). Secured to the plate and supported thereon is a small header 57 having a connection 58 to which by nipple 59 a main hydraulic line 60 is secured. The header is further provided with a pair of lateral connectors 61 to each of which an independent flexible conduit—as a rubber tube 62—is connected. Each tube 62 leads to an opening 63 in a cylinder 42.

The main hydraulic line 60 passes rearwardly through a pipe 64 which traverses the spreader box and communicates with a hand pump 65 which is connected by a suitable coupling 66 with a reservoir 67 for hydraulic fluid such as oil. The handle of the pump is designated at 68 and is pivoted on lugs 69; a pivot pin 70 carried by a forward portion of the handle is pivoted to the pump piston; numeral 71 designates the actuator of a relief valve. Pump 65 is itself standard commercial equipment and any suitable pump may be utilized.

In the actuation of the hitch oil is pumped to the cylinders and the lower ends of the cylinders tend to pivot forwardly while the upper ends pivot rearwardly toward the stationary wall 7. Movement of the cylinders with the oil pressure causes the channel iron 34 and its associated equipment including the frame 44 to pivot upwardly and to be supported in a floating or resilient manner. The channel iron turns toward the stationary wall 7 of the spreader as does the axle 37 though to a different degree; oil pressure is maintained and the hitch remains raised until the pressure for which the relief valve is set is exceeded; the hitch may be lowered by pressing downwardly on the arms 45 to cause an excess pressure on the valve.

It is to be noted that the structure described pivots at three points: at the stationary wall, at the cylinders and at the transverse member 46. The links 32, 33 are supported on the mount and pivot with the mount comprised by axle 37, the hydraulic lift means and the cross-member; the tow frame also supported by the mount likewise pivots with the mount.

As the channel iron pivots upwardly under the influence of the hydraulic lift it moves away from the axle and turns rearwardly of the axle; as the axle turns the braces 54 raise and raise the frame 44 forwardly providing support for the frame.

Pivoting in this manner raises the hitch for attachment of the hitch to a truck. Also the spreader box is raised slightly and will be raised somewhat more at the left end (Figure 2) thus tending to compensate for the difference in level already noted hereinbefore. Further, should a supporting wheel 36 move into a hole or the like during a paving operation the hinged arrangement tends to maintain the spreader box at its level.

Referring again to the drawings and particularly to Figure 2 a roller 72 is shown supported on a level with the skid 28; the roller projects laterally outwardly from the spreader box forwardly on the box. Roller 72 is provided with an integral shaft 73 which is received in a tubular housing 74 welded to the standard 29 and a pin 75 projects through the housing and shaft to retain the roller.

Rearwardly a second roller 76 is carried on a yoke 77 provided with a stud 78; stud 78 is received in a housing 79 welded to the box and a pin 80 passes through the housing and stud to retain the roller. This roller 76 in the traverse of the machine overlaps the path of the roller 72 and projects behind the dispensing portion of the box also. The combination of these rollers is effective to smooth the seam between pavement layings and also the rolls tend to maintain the box itself level.

Gouging of the laid surface 6 is substantially completely prevented by the roller-hitch combination due to their leveling effect. Thus the finished graded portion 5 (Figure 2) is protected and handwork on the seam is substantially eliminated.

It will be understood that this invention is susceptible to modification in order to adapt it to different usages and conditions and accordingly it is desired to comprehend such modifications within this invention as may fall within the scope of the appended claims.

What is claimed is:

1. In combination, a longitudinally extending paving material spreader having lateral supports, a hitch for towing of the spreader, said hitch comprising spaced wheels, an axle freely journalled between the wheels and a tow frame, the tow frame having attachment means forwardly thereon for securing the hitch to a towing vehicle, a cross-member extending substantially parallel to and above the axle closing and secured with the tow frame rearwardly, hydraulic lift means adapted for supporting the cross-member above the axle in spaced relation therewith and pivotally interconnecting the axle and cross-member, brace means secured to the axle and pivotally secured to the tow frame forwardly thereon whereby the frame may be raised and lowered upon axle rotation, and link means carried by the cross-member pivotally secured to the spreader between the lateral supports thereof and forming a draw bar connection.

2. In combination, a longitudinally extending paving material spreader having a forward wall and lateral supports, and a hitch having ground contacting wheels disposed in spaced relation forwardly of the spreader wall, an axle freely journaling the wheels and extending substantially parallel to the wall, a tow frame of the hitch having a cross-member in substantially vertical relation with the axle extending substantially parallel to and above the axle closing the rear of the frame, hydraulic lifting means coupling the axle and cross-member together for relative rotational movement therebetween and adapted to support the cross-member in vertical relation to the axle, link means secured to the cross-member and connected pivotally to the forward wall of the spreader between the lateral supports forming a draw-bar means for the spreader, attachment means for securing the hitch to a towing vehicle and carried forwardly on the tow frame, and brace means pivotally secured to the tow frame forwardly extending from the axle and secured to the axle for movement with the axle.

3. In combination, a longitudinally extending paving material spreader having a forward wall and a hitch for the spreader, said hitch having ground contacting wheels in spaced relation disposed forwardly of the spreader wall, link means extending forwardly and upwardly from the wall and pivotally mounted on the wall, a tow frame of the hitch having a cross-member closing the rear of the tow frame extending along the wall disposed forwardly of the wall and having the link means secured thereto whereby the tow frame and cross-member pivot with the link means, an axle below the cross-member in substantially vertical relation therewith and freely journalled on the wheels whereby the axle is rotatable relative to the wheels, hydraulic lifting means extending substantially vertically between the axle and cross-member rearwardly thereof coupling the axle and cross-member together for relative rotational movement therebetween and adapted to support the cross-member above the axle and to exert a turning force on the axle, attachment means of the frame of the hitch carried on the frame forwardly of the cross-member for securing the hitch to a towing vehicle, and brace means secured to the axle on each side of the frame and joined pivotally with the tow frame forwardly whereby turning movement imparted to the axle moves the frame.

4. In combination, a longitudinally extending paving material spreader having a forward wall and a hitch for the spreader, said hitch having ground contacting wheels in spaced relation disposed forwardly of the spreader wall, link means extending forwardly and upwardly from the wall and pivotally mounted on the wall, a tow frame of the hitch having a cross-member closing the rear of the tow frame, extending along the wall disposed forwardly of the wall and having the link means secured thereto whereby the tow frame and cross-member pivot with the link means, an axle below the cross-member in substantially vertical relation therewith and freely journalled on the wheels whereby the axle is rotatable relative to the wheels, hydraulic cylinders extending vertically rearwardly of the axle and cross-member and pivotally secured with the axle and each having pistons therein pivotally secured with the cross-member whereby the axle and cross-member are pivotal together, attachment means of the tow frame of the hitch carried on the tow frame forwardly of the cross-member for securing the hitch to a towing vehicle, and brace means secured on the axle extending forwardly of the wheels and pivotally secured to the frame forming support means for the tow frame.

5. In combination, a longitudinally extending paving material spreader having lateral supports, a hitch for towing of the spreader, said hitch comprising spaced wheels, an axle freely journalled between the wheels and a tow frame, the tow frame having attachment means forwardly thereon for securing the hitch to a towing vehicle, the attachment means being in the form of hook means mounted for adjustable extension from the frame, a cross-member extending substantially parallel to and above the axle closing and secured with the tow frame rearwardly, hydraulic lift means adapted for supporting the cross-member above the axle in spaced relation therewith and pivotally interconnecting the axle and cross-member, brace means secured to the axle and pivotally secured to the tow frame forwardly thereon whereby the frame may be raised and lowered upon axle rotation, and link means carried by the cross-member pivotally secured to the spreader between the lateral supports thereof and forming a draw-bar connection.

6. In combination, a longitudinally extending paving material spreader having a forward and rearward wall and lateral supports, and a hitch having ground contacting wheels disposed in spaced relation forwardly of the spreader wall, an axle freely journaling the wheels and extending substantially parallel to the wall, a tow frame of the hitch having a cross-member closing the tow frame rearwardly and extending above the axle longitudinally therewith, link means pivoted to the forward wall of the spreader between the lateral supports extending forwardly and secured fixedly to the cross-member, vertically disposed hydraulic lift means comprising piston means and cylinder means, a first bracket extending rearwardly from the cross-member, a second bracket extending rearwardly from the axle, means pivotally supporting the piston means from the first bracket and the cylinder means from the second bracket whereby the hydraulic lift means is pivotable relative to the axle and cross-member, hook means carried forwardly on the tow frame for attaching the hitch to a towing vehicle, brace means secured to the axle and movable therewith extending forwardly and pivotally secured to the tow frame, a hydraulic pump on the said rearward wall of the spreader, and conduit means extending from the pump forward to the hydraulic lift means for actuation of the latter.

7. In a hitch device for attachment to paving material dispenser and spreader apparatus for towing of the apparatus, a pair of spaced ground contacting wheels, a mount supported between the wheels comprising an axle freely journaled on the wheels, a cross-member extending above the axle substantially parallel thereto, hydraulic lift means pivotally interconnecting the axle and cross-member, link means secured to the cross-member and extending rearwardly therefrom for attachment to said apparatus, a tow frame extending forwardly from the cross-member and having attachment means for securing the tow frame to a towing vehicle, and brace means secured to the axle extending forwardly therefrom pivotally secured to the tow frame.

8. In a hitch device for attachment to paving material dispenser and spreader apparatus for towing of the apparatus, a pair of spaced ground contacting wheels, a mount supported between the wheels comprising an axle freely journalled on the wheels, a cross-member extending above the axle substantially parallel thereto, hydraulic lift means pivotally interconnecting the axle and cross-member, link means secured to the cross-member and extending rearwardly therefrom for attachment to said apparatus, a tow frame extending forwardly from the cross-member and having attachment means for securing the tow frame to a towing vehicle, and brace means secured to the axle extending forwardly therefrom pivotally secured to the tow frame, said hydraulic lift means comprising a pair of cylinders each having a piston therein, one of said cylinder and piston combinations being mounted adjacent each end of the cross-member.

References Cited in the file of this patent
UNITED STATES PATENTS

| | | |
|---|---|---|
| 2,215,455 | Abernathy et al. | Sept. 24, 1940 |
| 2,241,863 | Lett | May 13, 1941 |
| 2,258,205 | Halvorson | Oct. 7, 1941 |
| 2,500,064 | Foster | Mar. 7, 1950 |
| 2,717,783 | Flink | Sept. 13, 1955 |
| 2,800,340 | Standfuss | July 23, 1957 |
| 2,833,562 | Francois | May 6, 1958 |

FOREIGN PATENTS

| | | |
|---|---|---|
| 1,164,823 | France | Oct. 14, 1958 |